United States Patent [19]

Stuzzi

[11] 4,185,793

[45] Jan. 29, 1980

[54] CASSETTE USING TAPE-MARKING ELEMENTS

[75] Inventor: Viktor Stuzzi, Vienna, Austria

[73] Assignee: Firma Stuzzi Radiotechnische Fabrik Spezialunternehmen fur Magnettontechnik, Vienna, Austria

[21] Appl. No.: 947,741

[22] Filed: Oct. 2, 1978

[30] Foreign Application Priority Data

Oct. 3, 1977 [AT] Austria .................................. 7036/77

[51] Int. Cl.$^2$ ............................................... G03B 1/04
[52] U.S. Cl. ........................................ 242/199; 33/136
[58] Field of Search ........................ 242/191, 195–204, 242/209, 210; 360/72, 93, 96, 74, 132; 116/259, 278, 290, 321, 322; 33/141 R, 141 E, 141.5, 132, 136

[56] References Cited

U.S. PATENT DOCUMENTS 3,643,895  2/1972  Atsumi ................................ 242/201
3,813,689  5/1974  Marfy ................................... 360/74

FOREIGN PATENT DOCUMENTS 2709142  7/1978  Fed. Rep. of Germany ........... 242/199

Primary Examiner—Leonard D. Christian
Attorney, Agent, or Firm—Ernest F. Marmorek

[57] ABSTRACT

A cassette for use in a recording/reproducing machine has two reels which suspend a tape movable between the reels, and includes a measuring device for determining a length of tape taken off an initial tape position from one reel by the other, an indicating device for indicating the length of tape taken off from the initial tape position relative to the measuring device, and a plurality of settable marking elements disposed near the measuring device for marking selected locations of the tape by setting selectable of the marking elements from initial positions to selected positions, respectively; the selected marking elements may be reset to their initial positions.

8 Claims, 8 Drawing Figures

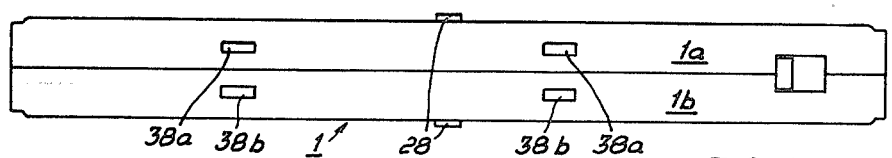
FIG. 1
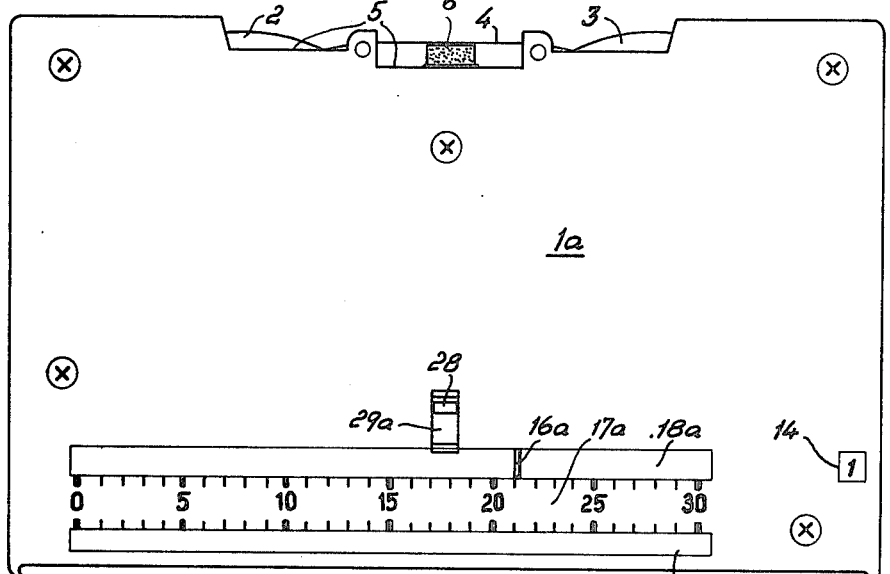
FIG. 2
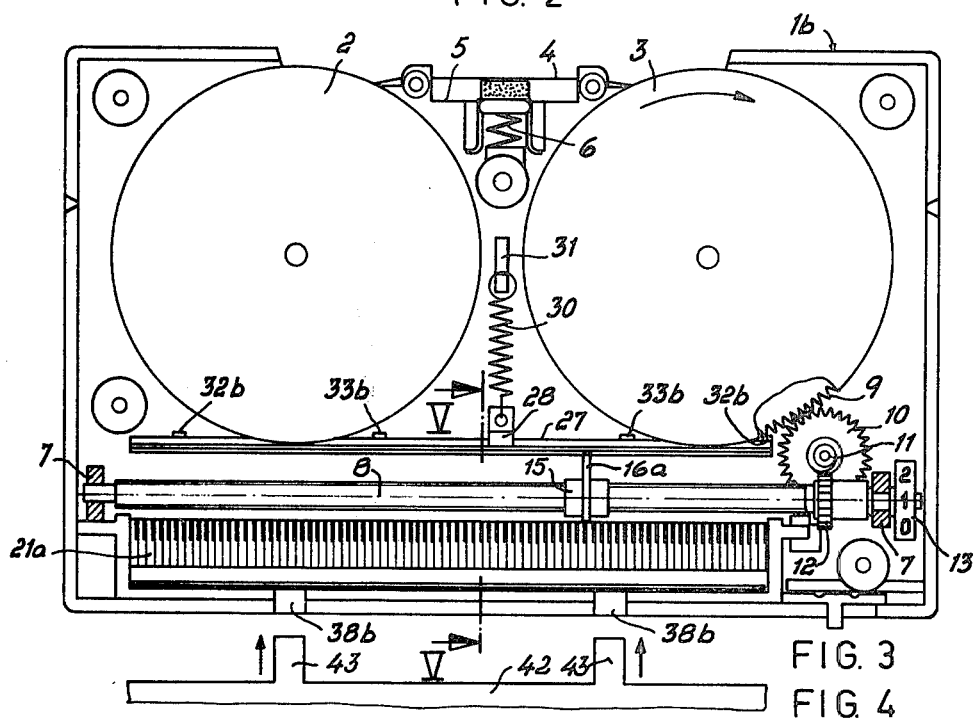
FIG. 3
FIG. 4

CASSETTE USING TAPE-MARKING ELEMENTS

BACKGROUND OF THE INVENTION

Indicating devices of this type for cassettes used in recording/reproducing machines do not only make it possible to ascertain how much tape is still available for recording or replay, but also permit certain recordings to be quickly located on the tape by noting a corresponding position of the indicator during replay, in order to reproduce desired sections of the recording, particularly individual dictations, in arbitrary succession. By noting the position of the indicator at the beginning and end of each recorded section, it is possible, during dictation, to estimate the length of individual dictations, and consequently the required format of a corresponding letter.

In a known cassette for recording/reproducing machines of the aforesaid type, as disclosed, for example, in U.S. Pat. No. 3,630,170, notations of the various indicator positions may be facilitated by an exchangeable paper strip being disposed along the indicating scale, from which the position of the pointer at the beginning and end of each dictation can be marked by the person who is dictating. It is a disadvantage, however, of this type of notation, that the paper strip must always be replaced, and also, that any pencil or any other writing instrument for marking the paper strip may be lost or mislaid.

SUMMARY OF THE INVENTION

It is accordingly an object of the present invention to devise a cassette of the aforesaid type with an indication device, which permits notation of an arbitrary number of recording locations on the tape, as well as a subsequent erasure of the marking notations, by using throughout permanently connected devices for marking, which cannot be lost, and which moreover need not be continuously replaced by new ones.

This object is attained, according to the present invention, by providing in a cassette for use in a recording/reproducing machine having reels suspending a tape being movable between the reels, measuring means for determining a length of tape taken off an initial tape position from one reel by the other, indicating means for indicating the length of tape taken off from the initial tape position relative to the measuring means, and a plurality of settable marking elements disposed near the measuring means for marking selected locations of the tape near the measuring means by setting selectable of the marking elements from initial positions to selective positions, respectively, the selected marking elements being resettable to their initial positions.

In an indicating device of this type, the desired resolution of a respective indicating position with a usable length of tape can be obtained by providing a correspondingly large number of marking elements, and the various recording sections can be determined or made visible with respect to their position and length along the indicating scale by selected actuation of the marking elements by means of a key or the like; as soon as they are no longer required, the selected or actuated marking elements can be reset. "Actuation" of the marking elements is understood to include each reversible change of state thereof, by means of which "non-actuated" marking elements may be differentiated from "actuated" marking elements.

It is advantageous if the measuring means is an elongated scale, and the indicating means are movable relative to the scale; it is further advantageous to provide actuating means for setting the selected marking elements to the selected positions, respectively, thereby marking the selected locations, and to provide resetting means for simultaneously resetting all of the selected marking elements to their initial positions.

It is further advantageous if each marking element is plate-shaped, and is displaceable in a direction transverse to the direction of elongation of the scale by the actuating means.

It is preferable if the set includes a housing, which has first and second openings, wherein the scale and indicating means are connected to the housing, and the indicating means may be viewed through the first opening. The marking elements are normally hidden from view by the housing, and the selected of the marking elements, upon being set, are viewable through the second opening.

It is advantageous if the marking element extend over a predetermined length of the housing, and if the actuating means include lever means; the lever means preferably include a bar extending substantially over the predetermined length, and the marking elements are preferably contactable by the bar. It is additionally advantageous to provide resiliently yieldable means connected to the lever means for urging the lever means in a direction away from the indicating means, whereby, upon the lever means being moved towards the indicating means in a direction transverse to the direction of elongation of the scale, the bar displaces a selected of the marking elements in a direction towards the second opening, so that the selected marking element may be viewed therethrough.

It is further advantageous if the marking elements face the indicating means, and if the resetting means for simultaneously resetting all of the selected marking elements to their initial positions include a rod disposed on the side of the marking elements facing away from the indicating means, and if the rod may be moved in a direction transverse to the direction of elongation of the scale against the force exerted by the resiliently yieldable means.

The housing has preferably an aperture, and the rod may preferably be operated through the aperture; it is further advantageous to provide a protective cover, which protective cover includes a projection extending therefrom, which projection may be passed through the aperture. The rod may then be contacted and moved by the projection, whereby, upon the protective cover being placed upon the housing, the projection operably moves the rod, the rod thereby resetting the selected marking elements to their initial positions.

It is further advantageous if the marking elements include a first group of marking elements associated with one reel, and a second group of marking elements associated with the other reel, if the housing has third and fourth openings, and the indicating means includes first and second pointers, which may be moved independently from one another; the first pointer may then be viewed through the first opening, the second pointer may be viewed through the first opening, and the selected of the marking elements of the first group, upon being set, may be viewed through the second opening, while the selected of the marking elements of the second group, upon being set, may be viewed through the fourth opening.

The cassette advantageously includes a second scale associated with the other reel, the first scale then being associated with the one reel; the bar is preferably pivotally operable to alternatively displace selected of the marking elements of one of the groups toward a corresponding one of the second and fourth openings, and it is preferable to provide a second rod substantially similar to the first rod. The first rod is then associated with the first group of marking elements, and the second rod is then associated with the second group of marking elements. By the provision of two separate openings, or viewing slots, it is possible to indicate on one and the same scale which side of the tape is operatively cooperating with the magnetic head, and where the marked locations are situated on the respective sides of the magnetic tape, which indicate the beginning and the end of individual dictations, so that any arbitrary portion of the tape can be quickly found by an appropriate rewind or fast forward operation of the tape.

BRIEF DESCRIPTION OF THE DRAWING

For a fuller understanding of the nature and objects of the invention, reference should be had to the following detailed description, taken in connection with the accompanying drawings, in which:

FIG. 1 is an elevational view of the cassette, according to the present invention, for a two-track tape;

FIG. 2 is a plan view of a closed cassette;

FIG. 3 is a plan view of the cassette with one part of the housing removed;

FIG. 4 is a view which shows the resetting actuator for the marking elements which may, for example, be formed by an edge or projection of a cover serving to store the cassette;

DESCRIPTION OF THE PREFERRED EMBODIMENTS

Figure 5:
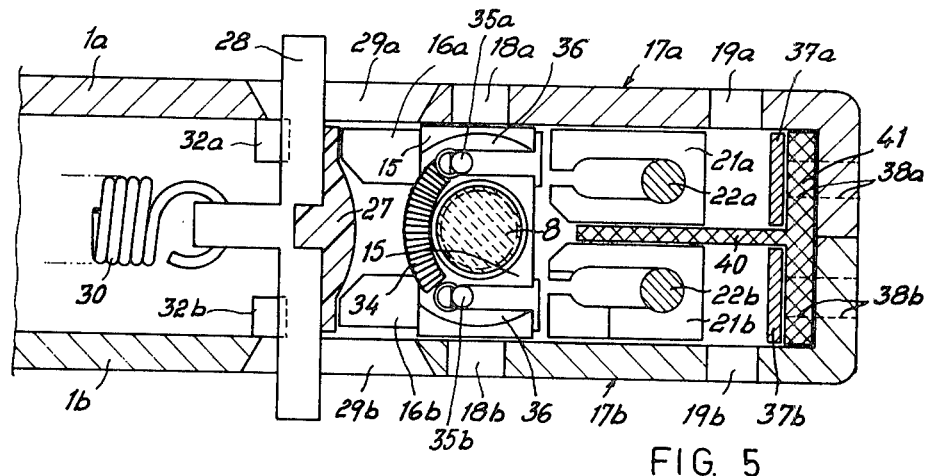
FIG. 5 shows a section along the line V—V of FIG. 3, in an enlarged scale, which substantially shows a portion of the marking device when not actuated.

In carrying the invention into effect, it will be seen that the cassette 1 consists of a housing including shells 1a, and 1b, in which there are disposed two revolvable reels 2 and 3, a tape 4 being suspended therebetween which may be rewound from one reel to another.

The tape is disposed in a recess 5 of the front side of the cassette, and is supported there in a known manner by a resilient pressing device 6, so that upon inserting the cassette in an appropriate recording/reproducing apparatus, the tape 4 makes operative contact at the required pressure with the magnetic head set.

At a side of the reels 2 and 3, disposed opposite to that of the recess 5, there is disposed a rotatable lead screw 8'; in the version shown, the lead screw 8 is rotatably disposed in bearings 7, the bearings 7 being only schematically shown located in the cover 1b. The lead screw 8 is driven by a toothed rim 9 of the reel 3 via a pinion 10, a worm gear 11, and a worm wheel 12. In order to make the slow revolution of the lead screw 8 visible, a wheel 13 provided with numerals or the like, can be provided on the axle of the lead screw 8, the reel 13 being partially visible through an opening 14 in the cassette.

A running nut 15 is further disposed on the lead screw 8, an axially displaceable pointer 16a being disposed in the running nut 15. The reels 2 and 3 are driven, in the example shown, in a known manner, in dependence on whether a fast forward or rewind mode is desired in a respective track, and the drive is accomplished by means of a driving roll of the recording/reproducing apparatus, which engages the rim of one or the other reel, the driving roll being at least partially disposed in the recess 5. When the reels are driven, the running nut 15 proceeds along the lead screw 8, which in turn causes the pointer 16a to proceed along a strip-shaped scale 17a disposed parallel to the lead screw 8, the scale 17a being preferably calibrated in a number of "minutes of duration of play." The movement of the pointer 16a may be viewed through an opening 18a in the cover 1a of the cassette 1 (compare FIGS. 2, 5, and 6).

A further opening 19a is disposed opposite the opening 18a (with respect to the scale 17a), the marking elements 21a being slidable towards the opening 19a by means of the pointer 16a, according to the present invention, so as to mark predetermined recorded locations on the tape.

The recording/reproducing tape cassette illustrated is suitable for recording/reproducing in two directions by means of two parallel tracks, the cassette being reversibly insertable, by being turned through 180° in the usual manner, into the recording/reproducing apparatus in order to effect a change from one track to another. For this reason, the indicating means is also provided on the other side of the cassette with a pointer 16b, which pointer 16b is axially displaceable in the running nut 15, an associated opening 18b, and a scale 17b, as well as an opening 19b, for the respectively actuated marking elements. Thus, the external appearance of the two covers 1a and 1b of the cassette, excepting the position and gradation of both scales 17a and 17b, is substantially similar.

Figure 6:
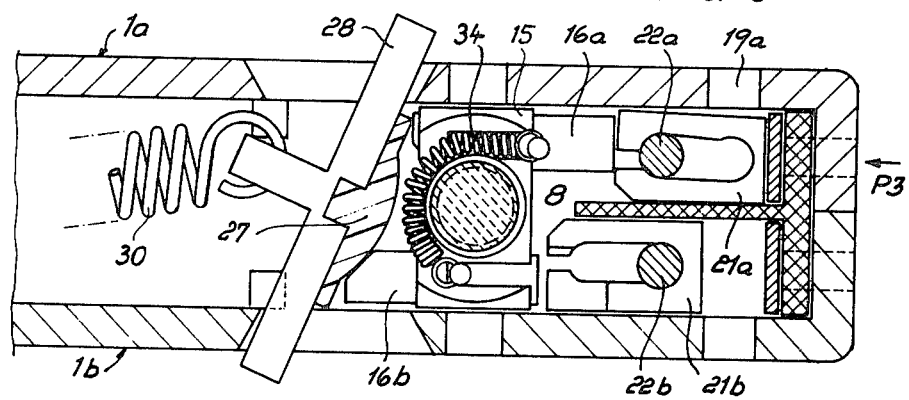
FIG. 6 is a view which corresponds to FIG. 5, following actuation of the marking device for one track of the tape.
Figure 7:
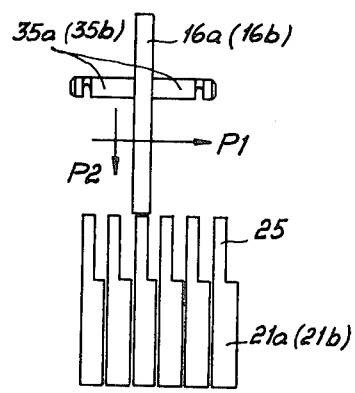
FIGS. 7 and 8 are two views at right angles to one another, showing selected cooperation of the displaceable pointer with a marking element.
Figure 8:
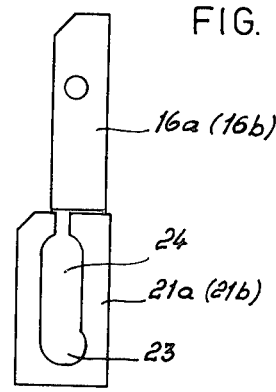

The marking device for both tracks are also similarly formed, so that only one need be described. Below the scale 17a, and hidden from view, there are disposed serially a plurality of plate-shaped marking elements 21a. These marking elements 21a, as can be particularly seen from FIGS. 5, 6, and 8, are substantially U-shaped, when viewed in a side view, and are, so to speak, threaded on a supporting rod 22a, which is disposed parallel to the lead screw 8, so that the rim of an enlarged, part-circularly-shaped opening 23 of the marking element 20a surrounds the supporting rod 22a loosely, the part-circular opening 23 being disposed in the vicinity of the transverse portion of the U-shaped marking element 21a, the supporting rod 22a thus determining the rest position of the corresponding marking element 21a. In the plan view, as seen in FIG. 7, the plate-shaped marking elements 21a are serially disposed, there existing little play between the marking elements. Each marking element 21a has an end portion 25, facing the pointer 16a, the end portion 25 being reduced in thickness with respect to the remaining portion of the marking element 21a, so that only a single marking element can be contacted by the pointer 16a, the pointer 16a may be moved along the direction of the arrow P1, in FIG. 7, along the scale 17a, and may also be axially displaced along the direction of the arrow P2, in a manner to be described later, in order to effect a displacement of the marking element 21a on the supporting rod 22a. Upon displacement of marking element 21a in the direction of the arrow P2 by means of the pointer 16a, the supporting rod 22a penetrates into a relatively narrow opening 24 of the marking element 21a, so that a clamp fit exists between the supporting rod 22a and the respective marking element 21a, when the displacement motion into the marking position has been terminated, and the pointer 16a has been retracted in a manner yet to be described.

The displacement of an arbitrary marking element 21a into a marking position, which corresponds to a respective position of the pointer 16a of the indicating means, the corresponding marking element then being visible, according to FIG. 6, through the opening 19a from the exterior, is accomplished in the version shown, with the aid of an auxiliary pressing rod 27, which is disposed parallel to the lead screw 8. The rod 27 is secured at its center to a lever 28, which may pass through openings 29a or 29b of the respective covers 1a and 1b of the cassette 1, which lever 28 is urged by a spring 30, anchored to a member 31 of the cover 1b, so as to abut bosses 32a and 32b, formed as projections on respective covers 1a and 1b (see FIGS. 3, 5, and 6). Additional bosses 33b, only visible in FIG. 3, extend as projections from the lower cover 1b to the vicinity of the (non-illustrated) upper cover 1a, and support the rod 27 in its rest position even if the upper cover 1a is removed. With the aid of the end portions of the two-armed lever 28, projecting through the openings 29a or 29b, of the covers 1a and 1b, respectively, to the exterior, the rod 27 can be pivoted, according to FIG. 6, in a clockwise or counter clockwise direction. By the pivotal motion of the bar 27 shown in FIG. 6, the pointer 16a, which is slidably disposed in an axial direction in the running nut 15 (see FIG. 3), is displaced in the direction of the arrow P2, in FIG. 7, independent of a respective position of the pointer 16 or with respect to the scale 17a, the pointer 16a therefore causing a corresponding displacement of a marking element 21a, aligned therewith, so that the marking element 21a becomes visible through the opening 19a (compare FIG. 6.). The corresponding marking element 21a is then retained in the marking position in view of its clamp fit on the supporting rod 22a in the already described manner.

Following release of the lever 28, the bar 27 is pulled back into its rest position by the spring 30. The pointer 16a must also be withdrawn into its rest position, following marking with respect to the running nut 15, so that it may again be moved freely along the scale 17a in the direction of the arrow P1, shown in FIG. 7.

The return motion of the pointer 16a to its rest position, shown in FIGS. 3 and 5, is accomplished in the version shown by two springs 34, illustrated in FIGS. 5 and 6. One end of each spring 34 engages a pin 35a, extending from each side of a respective pointer 16a or 16b, the pins 35a being disposed within lateral recesses 36a of the running nut 15. The other end of each spring 34 is not anchored in the examples shown on the cassette, but is bent around the lead screw 8, abutting the running nut 15, and is anchored to respective lateral pins 35b of the pointer 16b, which pointer 16b is associated with a second track and cooperates with a scale 17b and the marking elements 21b, on the other side of the cassette. Upon the upper pointer 16a, shown in FIG. 6, being advanced, the lower pointer 16b remains in its rest position, and upon the bar 27 being returned to a rest position according to FIG. 5, the pointer 16a is also returned to its rest position by means of the spring 34. The two rows of marking elements 21a, 21b are supported externally by the covers 1a, 1b, and internally by the rod 41 of a carrier 40, which, according to 5, has a T-shaped cross section, the carrier P being inserted into the cassette and remaining therein in a secure position by stops abutting the carrier 40. In the spaces between the rod 41 of the T-shaped carrier 40 and the two rows of marking elements 21a, 21b, there are provided inwardly movable rods 37a, 37b, on which rods 37a and 37b pressure can be exerted through openings 38a and 38b in the respective covers 1a and 1b, as well as in the rod 41 of the carrier 40 in the direction of the arrow P3, in FIG. 6, in order to return the marking elements 21a, 21b, which are positioned in a "marked" location, from that location to their rest position, when they are no longer required, for example, when the typist has reduced all dictations to paper from the recording/reproducing machine.

The required resetting of the bar 37a or 37b is preferably facilitated by, according to FIG. 4, projections 43 being formed on at least one openable fold of a conventional stiff and pocket-like casing 42 for the cassette 1, which projection 43 may be inserted as pressure elements into the openings 38a or 38b of the cassette 1. Thus, all markings can be erased in a simple manner prior to sliding the cassette into the casing, or the cassette may be slid into the casing with all markings being maintained intact on the cassette having a recording thereon, for subsequent utilization.

The resetting device may also be combined with a demagnetization mechanism for the tape and the cassette, which may have the form of an alternating current coil generating an erasing field, the cassette being receivable by the coil, so that concurrently with the erasure of all recordings a resetting of all markings to the rest or initial position can be effected.

When utilizing tape cassettes in recording/reproducing machines, where recording is accomplished by means of a hand-held microphone, setting of the markings may be accomplished remotely, for example, by actuating a button provided on the hand-held microphone. Actuation of such a button or switch may excite a magnet in the recording/reproducing machine, which in turn, may advance a pin or the like, which in turn, acts on the lever 28 and sets the same so as to obtain a marking.

The embodiment shown permits variations within the scope of the invention. Thus, for example, the motion of the pointer for indicating the length of tape taken off can be derived in a known manner from a lever system scanning the variable radius of the tape accumulated or remaining on a reel. The scale, and the series of marked elements need not be formed in a straight line. The drive may be accomplished by a drive roll immediately engaging the tape. In lieu of the pointer, it is possible to use a slider movable with the pointer for selecting actuation from the marking elements. The marking elements may have alternate forms and may be moved in another manner, for example, they may have the form of sector-like laminations, which may be pivoted into an opening for viewing the lamination, or they may have the form of pins, which, with the aid of a wedge-like or cam-like portion of the axially movable pointer or slider, may be displaced from a "snap-in" rest position to a "snap-in" marked position.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A cassette, for use in a recording/reproducing machine having two reels suspending a tape being movable between the reels, comprising in combination:

measuring means, including an elongated scale, for determining a length of tape taken off an initial tape position from one reel by the other, indicating means for indicating the length of tape taken off from the initial tape position relative to said elongated scale, said indicating means being movable along said scale, a plurality of settable marking elements having initial positions and being disposed along said scale actuating means couplable to said indicating means for setting selected marking elements to selected positions, respectively, in the course of movement of said indicating means along said scale, thereby marking particular values of the length of tape, and resetting means for simultaneously resetting all of said selected marking elements to their initial positions.

2. A cassette according to claim 1, wherein each marking element is plate-shaped and is displaceable in a direction transverse to the direction of elongation of said scale by said actuating means.

3. A cassette according to claim 1, further including a housing having first and second openings, said scale and indicating means being viewable through said first opening, said marking elements being normally hidden from view by said housing, the selected of said marking elements, upon being set, being viewable through said second opening.

4. A cassette according to claim 3, wherein said marking elements extend over a predetermined length of said housing, wherein said actuating means comprises lever means, said lever means including a bar extending substantially over said predetermined length, said marking elements being contactable by said bar, and further comprising resiliently yieldable means connected to said lever means for urging said lever means in a direction away from said indicating means, whereby, upon said lever means being moved towards said indicator means in a direction transverse to the direction of elongation of said scale, said bar displaces a selected of said marking elements in a direction towards said second opening, so that the selected marking element is viewable therethrough.

5. A cassette according to claim 4, wherein said marking elements face said indicating means, said resetting means for simultaneously resetting all of said selected marking elements to their initial positions comprising a rod disposed on a side of said marking elements facing away from said indicator means, and being movable in a direction transverse to the direction of elongation of said scale against a force exerted by said resiliently yieldable means.

6. A cassette according to claim 5, wherein said housing has an aperture, said rod being operable through said aperture, and further comprising a protective cover including a projection extending from said protective cover and passable through said aperture, said rod being contactable and movable by said projection, whereby, upon said protective cover being placed upon said housing, said projection operably moves said rod, said rod thereby resetting said selected marking elements to their initial positions.

7. A cassette according to claim 5, wherein said marking elements include a first group of marking elements associated with one reel, and a second group of marking elements associated with the other reel, and wherein said housing has third and fourth openings, and said indicating means includes first and second pointers movable independently from one another, the first pointer being viewable through the first opening, the second pointer being viewable through the third opening, the selected of the marking elements of said first group, upon being set, being viewable through said second opening, the selected of the marking elements of said second group, upon being set, being viewable through said fourth opening.

8. A cassette according to claim 7, further comprising a second scale associated with the other reel, the first scale being associated with the one reel, said bar being pivotally operable to alternatively displace selected of said marking elements of one of said groups towards a corresponding one of said second and fourth openings, and a second rod substantially similar to the first rod, the first rod being associated with the first group of marking elements, and the second rod being associated with the second group of marking elements.

* * * * *